United States Patent
Quinlan

[11] Patent Number: 6,144,176
[45] Date of Patent: *Nov. 7, 2000

[54] METHOD FOR REDUCING ACOUSTIC AND VIBRATION ENERGY RADIATED FROM ROTATING MACHINES

[75] Inventor: Daniel A. Quinlan, Warren, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/733,242

[22] Filed: Oct. 2, 1996

[51] Int. Cl.⁷ .................................................. G05B 5/00
[52] U.S. Cl. .................. 318/460; 318/611; 318/629; 318/599; 318/606; 318/811; 388/831
[58] Field of Search .................................. 318/254, 439, 318/460, 599, 600–608, 611, 623, 629, 799–815; 388/804–820, 829–831

[56] References Cited

U.S. PATENT DOCUMENTS

| 4,673,851 | 6/1987 | Disser | 318/341 |
|---|---|---|---|
| 4,963,804 | 10/1990 | Geiger | 318/640 |
| 5,162,709 | 11/1992 | Ohi | 318/254 |

FOREIGN PATENT DOCUMENTS

| 3930543 | 3/1990 | Germany. |
|---|---|---|
| 4128109 | 3/1992 | Germany. |
| 2232835 | 12/1990 | United Kingdom. |

Primary Examiner—David Martin
Attorney, Agent, or Firm—Gibbons, Del Deo, Dolan, Griffinger & Vecchione

[57] ABSTRACT

A method and apparatus for substantially reducing tonal noise and or vibration generated by a rotating machine. The power supplied to the rotating machine or motor drive signal is modulated as a function of time so that the shaft rate of the rotating machine is varied as a function of time. The motor drive signal or power signal can be modulated in an alternating current (AC) machine wherein the shaft rate is related to the power line frequency, as well as a direct current (DC) machine wherein the shaft rate is related to the DC level applied, to alter the shaft rate as a function of time. Such drive power modulation causes the drive signal energy to spread into new frequencies. As a result, the radiated tonal components are spread out such that the strength of the rotating machine's tonal radiation is substantially reduced. In addition, "beating" effects related to the operation of multiple machines can be reduced.

23 Claims, 2 Drawing Sheets

METHOD FOR REDUCING ACOUSTIC AND VIBRATION ENERGY RADIATED FROM ROTATING MACHINES

FIELD OF THE INVENTION

This invention relates to rotating machinery, and more particularly to rotating machinery that radiate acoustic and vibration energy.

BACKGROUND OF THE INVENTION

Rotating machinery will typically introduce both acoustic and vibration energy into any fluids or structures surrounding the machinery. The acoustic and vibration energy can be caused by both random and deterministic processes related to the operation of the machinery. Random processes result in noise or vibration that is spread over a wide band of frequencies. Deterministic processes, on the other hand, often generate energy that is confined to a family of distinct frequencies radiated as "pure" tones. Typically, for a machine having a rotating shaft, the tones are radiated at frequencies that are integer multiples of the frequency at which the shaft rotates. As a result, rotating machines radiate acoustic and vibration spectra that contain both broadband and tonal components.

Those skilled in the art are aware that systems which radiate strong levels of tonal noise are annoying to humans. In fact, noise control engineers are aware that tonal noise can be more annoying to humans than other forms of acoustic noise. As a result, the noise control engineers often focus on the reduction of tonal noise generated by such rotating machinery.

In reducing the tonal noise generated by multiple rotating machines operating in the same environment, of particular concern is the tonal noise generated when two or more machines spin at nearly the same rate. That is, those interested in reducing tonal noise radiated from a plurality of rotating machines within close proximity to each other are particularly concerned with the tonal noise generated when each machine radiates tones at a slightly different frequency than the other machines. In such an environment, the frequencies of the tones radiated from each machine will vary slowly with respect to each other. As a result, the tones will constructively and destructively interact to create tones that "beat". That is, the tones radiated from each machine will interact with each other such that a noise having a given envelope variation ("beating effect") will be perceptible to the human ear. Such a beating effect can be heard in propeller driven aircraft, or in rooms where multiple fans are running. As most are aware, the beating noise can be considered to be particularly annoying to the human ear.

Moreover, since a structure can be characterized by the natural resonant frequencies at which it most easily vibrates, those skilled in the art are also concerned with vibration energy radiated by such rotating machinery. That is, if the vibrational frequency(s) generated by a rotating machine match the natural resonant frequency(s) of a given structure near the machinery, the structure can be forced into strong vibration. The result can be structural fatigue and/or additional acoustic noise generation. As a result, those skilled in the art are continuously concerned with minimizing the effect of such acoustic and vibration energy radiated by rotating machinery.

SUMMARY OF THE INVENTION

Accordingly, the present invention is directed to a method for substantially reducing tonal noise and or vibration generated by a rotating machine. To attain this, the power supplied to the rotating machine or motor drive signal is modulated as a function of time so that the shaft rate of the rotating machine is varied as a function of time.

In general, one of the operating parameters that defines the shaft rate of a rotating machine is the drive signal imposed upon its motor. In an alternating current (AC) machine, the shaft rate will usually be related to the power line frequency. In a direct current (DC) machine, the shaft rate will be related to the DC level applied. In either case, the shaft rate can be altered by modulating the motor drive signal as a function of time. This causes the shaft rate to change with time which, in turn, spreads-out the tonal components of the machine-generated acoustic noise and vibration. As a result, the strength of the rotating machine's tonal radiation is reduced.

In one embodiment, the power to a motor that turns the impeller of an air-moving device is varied as a function of time to minimize the impeller-generated acoustic noise heard, and the vibration induced into a structure holding the air-moving device. In another embodiment wherein a multiple number of machines are beating with each other, the tonal noise is reduced by applying a modulating signal to the power of each machine so that the phase relationship between the tonal noise of each machine is randomized, thus reducing the strength of the beating. Thus, the present invention overcomes to a large extent the limitations of the prior art.

These and other features of the invention are described in more detail in the following detailed description of the embodiments of the invention when taken with the drawings. The scope of the invention, however, is limited only by the claims appended hereto.

DETAILED DESCRIPTION OF ILLUSTRATIVE EMBODIMENTS OF THE INVENTION

Figure 2:
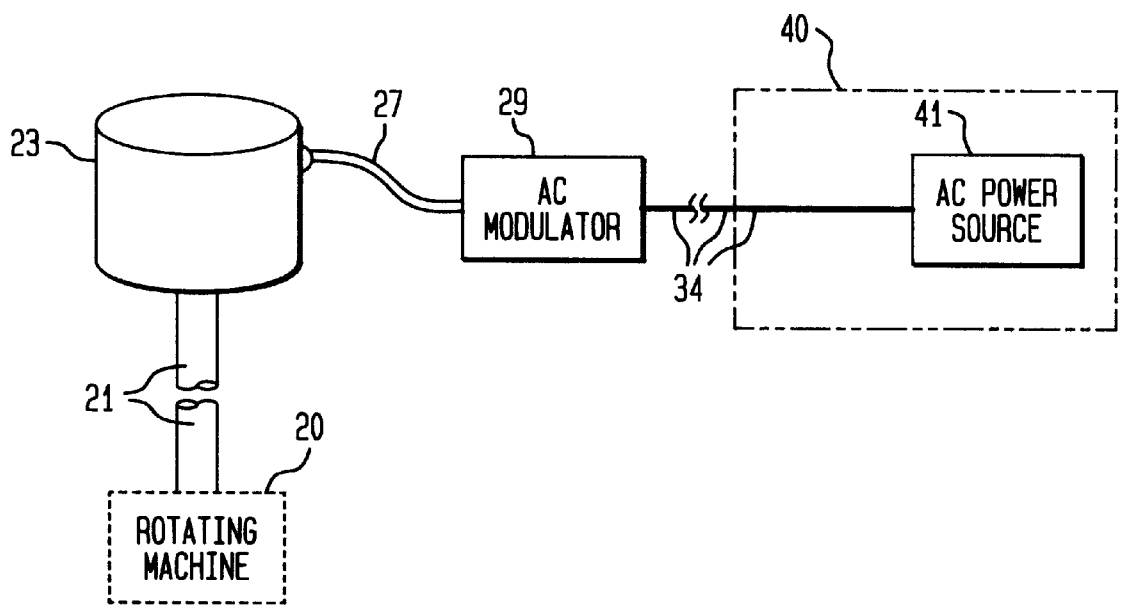
FIG. 2 is a block diagram showing the interrelationship between power source, modulator, motor, and machine in an exemplary AC embodiment of the present invention.
Figure 3:
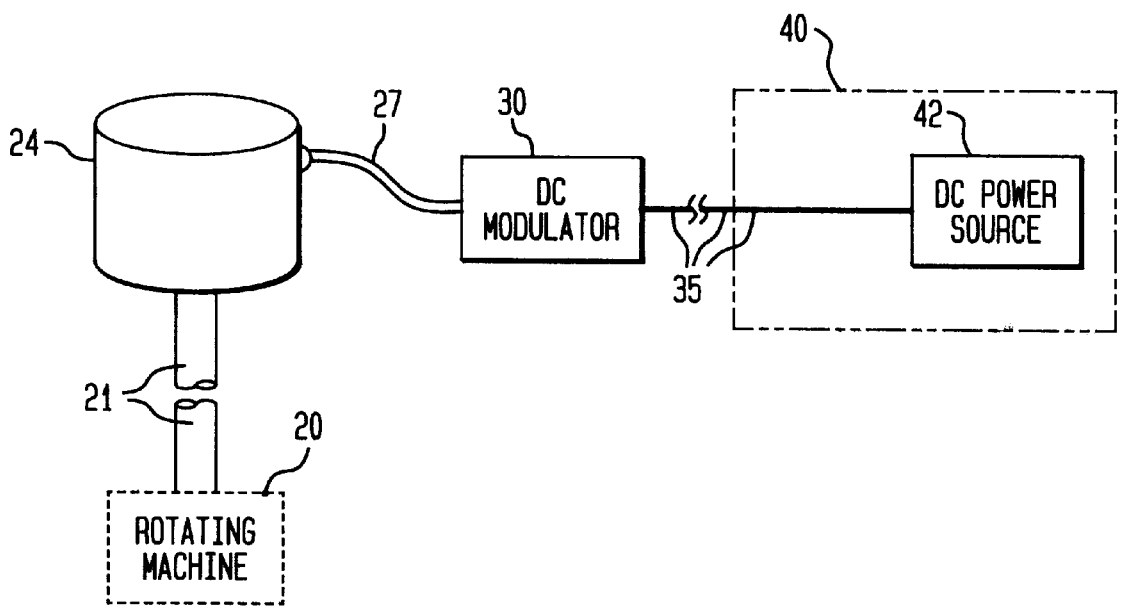
FIG. 3 is a block diagram showing the interrelationship between power source, modulator, motor, and machine in an exemplary DC embodiment of the present invention.

Referring to FIGS. 2 and 3 there is shown a block diagram demonstrating the interrelationship between power source, modulator, motor, and machine, in accordance with the present invention. FIG. 2 is an exemplary AC embodiment and FIG. 3 is an exemplary DC embodiment. In the AC embodiment of the present invention, drive circuit 40 is comprised of an AC power source 41 coupled to deliver AC power over a power line (bus or conduit) 34. The power line is coupled to an AC modulator 29. The AC modulator 29 is coupled to an AC motor 23 and a modulated motor drive signal is available to power the AC motor 23. The AC motor 23 is coupled to a shaft 21 which is in turn coupled to, and providing the motive force to rotate, a rotatable machine 20. An illustrative list of possible rotatable machines coupled to the shaft 21 includes air moving devices, compressors, evaporators and centrifuges, however, any rotating equipment capable of being powered by an AC power source are also contemplated, as would be apparent to those skilled in the art.

In the DC embodiment of the present invention, drive circuit 40 is comprised of a DC power source 41 coupled to deliver DC power over a power line (bus or conduit) 34. The power line is coupled to a DC modulator 29. The DC modulator 29 is coupled to a DC motor 23 and a modulated motor drive signal is available to power the DC motor 23. The DC motor 23 is coupled to a shaft 21 which is in turn coupled to, and providing the motive force to rotate. a rotatable machine 20. An illustrative list of possible rotatable machines coupled to the shaft 21 includes air moving devices, compressors, evaporators and centrifuges, however, any rotatable equipment, capable of being powered by a DC power source, are also contemplated, as would be apparent to those skilled in the art.

As stated above, in operation, a rotating machine will impose fluctuating forces on the surrounding fluids and structures, and the frequencies of those fluctuating forces will be related to the speed of the machine's rotation. For example, in a propeller driven aircraft an occupant will hear noise and feel vibrations at frequencies which are multiples of the engine shaft rate.

In rotating machines driven by electric motors, one of the operating parameters that defines the shaft rate is the drive signal imposed upon the motor. In an AC machine, the shaft rate will usually be related to the power line frequency. In a DC machine, the shaft rate will be related to the DC level applied. In either case, however, the shaft rate can be altered by modulating the motor drive signal as a function of time.

The modulation of the drive power signal causes the drive signal energy to spread into new frequencies, thus causing the motor to change the shaft rate with time. This, in turn, causes the tonal components of the acoustic noise and vibration to spread-out, thus reducing the strength of the tonal radiation at any given frequency. In other words, the resulting varied rate of rotation converts the energy of the peak tonal amplitudes of the motor and machine into a spread spectrum of tonal sound amplitudes, thus reducing the peak amplitudes and the sometimes corresponding irritating effects.

Modulating the power signal or waveform supplied to a motor as a function of time alters the normally constant rotational frequency of the motor (and in turn the frequency of the shaft coupled machine or load) also as a function of time. Since the rotational rate of the device will not be constant, the resulting noise of the device will no longer exhibit the same tonal amplitudes as it would have exhibited if powered by an unmodulated supply. In other words, the tonal energy (formerly occurring at one or more particular frequencies) will be spread over a range or band of frequencies corresponding to the modulated rotational speed and its harmonics. Therefore, the peak tonal energy present at a frequency or frequencies characterized with the greatest noise amplitude will be reduced utilizing the techniques described herein when compared to use of an unmodulated power supply.

The tonal energy reduction techniques presented herein require only the use of modulation techniques to modulate the motor shaft rotational rate. The invention does not require a feedback loop or optimal speed determination to be re-input into the system after modulation. The reduction of tonal energy from the machine is accomplished solely after using the modulation techniques described herein. Further, the present invention does not require acoustic feedback components nor does it require vibration monitors or analysis of device frequency.

The amount of spreading (i.e. bandwidth over which the energy will be distributed) depends upon the type and strength of the modulation applied to the drive signal, and on the response of the media surrounding the machine to the new frequency components of the radiated noise. While the response of the surrounding media is difficult to quantify mathematically in a general sense, the effect of the applied modulation on the electrical drive signal can be determined through communication theory.

Modulation of an AC signal can be accomplished in a number of alternative methods, including altering the frequency, voltage or phase of the waveform as a function of time from its constant unmodulated value. For example, a drive signal, d(t), applied to an AC rotating machine can be represented as $d(t)=A\sin(2\pi ft+\phi)$. In this representation, the amplitude, A, and the sinusoidal frequency, f, are time-invariant. The shaft rotation rate in revolutions/sec. will be equal to f (Hz). By modulating the drive signal as described in the present invention, a time variation will be introduced into the amplitude, A, frequency, f, and/or phase, $\phi$, of d(t) shown above. Such a modulated drive signal, $d_m(t)$, can be represented in its simplest form as $d_m(t)=b(t)\sin(2\pi f(t)t+\phi(t))$.

In many instances, the most useful forms of b(t), f(t) and $\phi(t)$ are likely to be random functions. The modulating signal can be the function of b(t), which can be the random noise signal as well. As seen in the formulaic relationship above, the system only requires input of random functions, e.g., b(t), f(t) or any other useful randomizing functions, without additional re-input in a feedback control process. For instance, given an AC rotating machine driven by a signal whose nominal phase is $\phi_l$, a relevant form for $\phi(t)$ is $\phi(t)=\phi_l+\delta(t)$ where $\delta(t)$ is a random variable constrained by some limits (e.g. $-\pi/4 \leq \delta(t) \leq \pi/4$). For a DC rotating machine, an analogous implementation of the method would be to apply random modulation to the input voltage. Assuming the nominal input voltage is B, a relevant form of b(t) is $b(t)=B+\gamma(t)$, where $\gamma(t)$ is a random variable constrained by some limits (e.g. $-B/4 \leq \gamma(t) \leq B/4$). In a refinement of this example, $\gamma(t)$ is a bandpassed pink noise (i.e. constant spectral energy over constant percentage bandwidths).

As is well known from communications theory, the forms of modulation that can be applied to a simple sinusoid such as the drive signal, d(t), include amplitude modulation, frequency modulation and phase modulation. Each of these forms of modulation causes spreading of the signal's energy in the frequency domain. The details of the spreading depend upon the functions chosen for b(t), f(t) and/or $\phi(t)$. That is, without modulation, all the energy in the drive signal will occur at the frequency f. When modulation is applied, the frequency content of the drive signal is dictated by forms of b(t), f(t) and/or $\phi(t)$.

It should be noted that since DC rotating machines are driven using pulsed signals, digital communications theory can be used to derive modulation methods similar the method described above for an AC-powered machine. Thus, whether modulating the power to a DC machine or an AC machine, the modulation causes energy to be taken from the original signal frequency and spreads it into new frequency bands.

Figure 1:
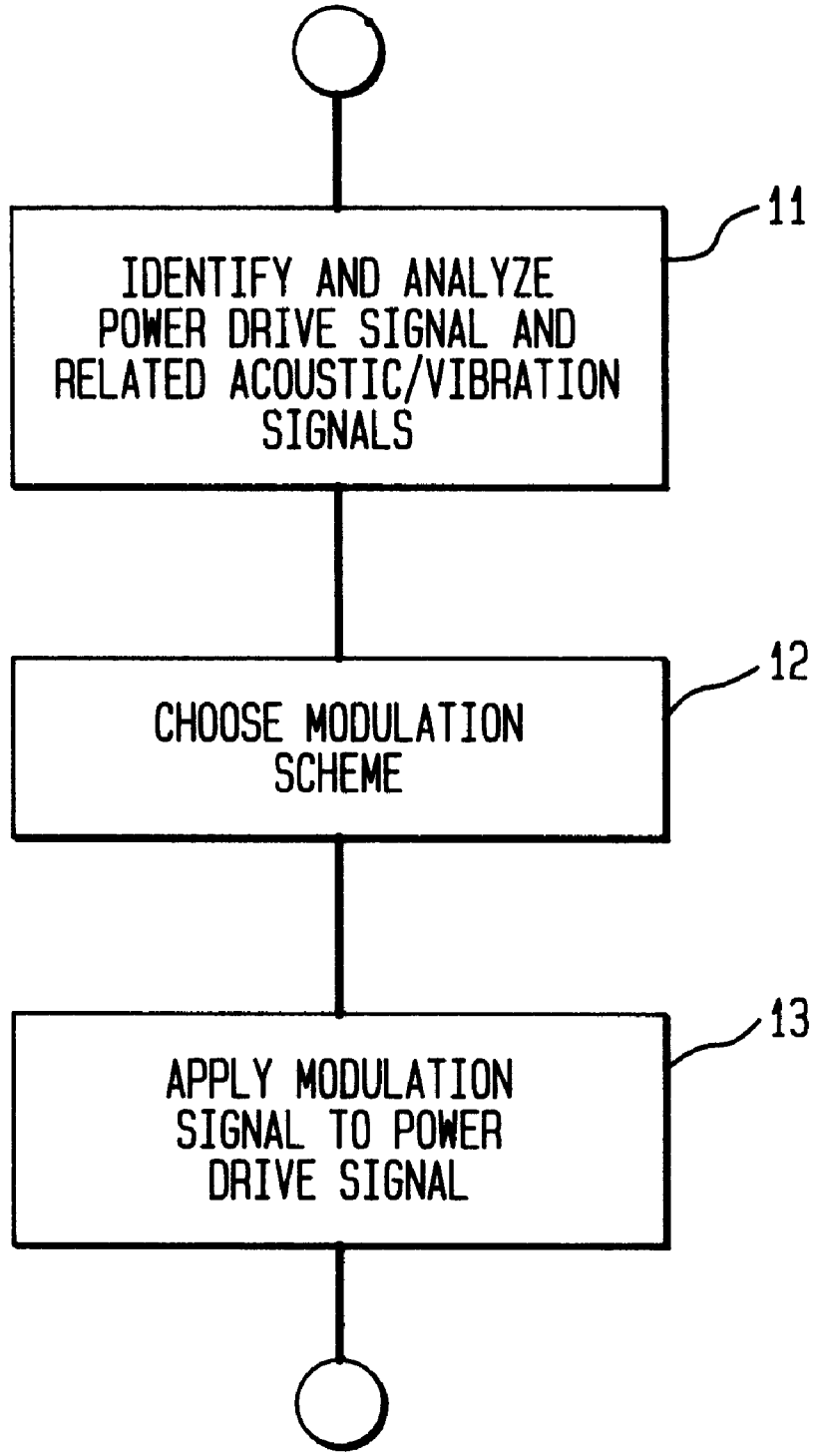
FIG. 1 is a flow chart showing the steps of one method for reducing the acoustic and vibration energy of a rotating machine according to the present invention.

Referring now to FIG. 1, there is shown one method of reducing the tonal noise of rotating machines according to the present invention, hereinafter referred to as noise reduction method 10. As shown, the power drive signal and related acoustic/vibration signals are first identified and analyzed, step 11. Then, in step 12, a modulation signal is chosen for modulating the identified power drive signal such that the shaft speed will fluctuate in the desired manner. The modulation signal is then applied to the power drive signal, step 13, to spread the tonal noise over a given spectrum. As a result, the tonal noise radiated from the rotating machine is substantially reduced. Thus, the method according to the present invention overcome, to a large extent, the limitations of the prior art Systems which utilize rotating machines that require the shaft speed to remain essentially time-invariant, however, can not implement noise reduction method 10, as described above, without causing system performance problems. Some of these time-invariant systems, however, could utilize noise reduction method 10 if noise reduction method 10 included a step for controlling the modulation of the power drive signal so that the mean shaft speed would remain constant over time.

Examples of such time-invariant machines include air moving devices, compressors, evaporators and centrifuges. For these machines, the work done by the machine over a relatively long period of time is the central performance parameter. As a result, fluctuations about the mean for short intervals will not degrade performance. For example, a key design parameter of a small axial cooling fan is the flow-rate through the fan in feet-per-minute (FPM), and the heat load removal rate in watts/min. For such a fan, if the modulation of the power signal is controlled such that the shaft rate fluctuations occur over milli-second intervals and that the FPM over the long-term is maintained, there will be no adverse thermal affects on the system. In addition, the added turbulence due to the shaft rate fluctuation may increase the net heat removal.

There are many embodiments for providing a means for reducing the tonal noise radiated from rotating machinery by modulating the drive power signal according to the present invention. The above description only includes exemplary embodiments of the many methods for implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. A method for reducing the tonal energy radiated from a machine having a rotating shaft, and a motor drive signal for rotating the shaft at a given rate, the method comprising the steps of:
   externally modulating the motor drive signal as a function of time to alter the speed of the rotating shaft as a function of time, said step of externally modulating the motor drive signal accomplished independently from acoustic parameter feedback from said machine and resulting in a modulated motor drive signal; and
   varying said function of time to cause the spreading of the acoustic and vibration tonal components of said machine;
   wherein said tonal energy radiated from said machine is reduced at given peak frequencies.

2. The method of claim 1 further comprising the step of controlling said modulating of the motor drive signal to maintaining a mean shaft speed substantially equal to the given shaft rate of rotation over time.

3. The method of claim 2 further comprising the step of identifying and analyzing the drive power and acoustic/vibration signals to determine a modulation scheme for reducing the tonal energy radiated from the machine.

4. The method of claim 3 wherein the rotating machine is an air-moving device.

5. The method of claim 3 wherein the rotating machine is a compressor.

6. The method of claim 3 wherein the rotating machine is an evaporator.

7. The method of claim 3 wherein the rotating machine is a centrifuge.

8. The method of claim 3 wherein the machine is driven by a direct current (DC) electric motor.

9. The method of claim 3 wherein the machine is driven by an alternating current (AC) electric motor.

10. The method of claim 1, wherein the motor drive signal is defined as:

$$d(t)=A*\sin(2\pi ft+\phi)$$

where d(t) is the motor drive signal, A is amplitude of the motor drive signal, $f$ is a sinusoidal frequency, t is time, and $\phi$ is phase of the motor drive signal.

11. The method of claim 1, wherein the modulated drive signal is defined as:

$$d_m(t)=b(t)\sin(2\pi f(t)*t+\phi(t))$$

where $d_m(t)$ is the modulated drive signal, t is time, b(t), $f(t)$ and $\phi(t)$ are random functions.

12. The device of claim 14, wherein the drive signal is defined as:

$$d(t)=A*\sin(2\pi ft+\phi)$$

where d(t) is the drive signal, A is the amplitude of the motor drive signal, $f$ is a sinusoidal frequency, t is time, and $\phi$ is phase of the motor drive signal.

13. The device of claim 14, wherein the modulated drive signal is defined as:

$$d_m(t)=b(t)\sin(2\pi f(t)*t+\phi(t))$$

where $d_m(t)$ is the modulated drive signal, t is time, b(t), $f(t)$ and $\phi(t)$ are random functions.

14. A device for reducing tonal energy comprising:
   a rotating shaft which radiates tonal noise;
   a drive circuit for generating a drive signal to power said rotating shaft; and
   a modulating circuit for modulation of said drive signal to alter the speed of the rotating shaft as a function of time;
   wherein said modulation results in a modulated drive signal causing the acoustic and vibration tonal components of said machine to spread out by varying said function of time;
   wherein the radiated tonal energy from said device at given frequencies is reduced and spread over a given frequency band, said modulating circuit separate from and external to a motor driving said rotating shaft, said modulating circuit operational independently from acoustic parameter feedback from said motor and said rotating shaft.

15. The device of claim 14 wherein said drive signal is randomly modulated about a mean value so that a given mean shaft speed is maintained over time.

16. The device of claim 15 wherein said rotating shaft drives an air-moving device.

17. The device of claim 15 wherein said rotating shaft drives a compressor.

18. The device of claim 15 wherein said rotating shaft drives an evaporator.

19. The device of claim 15 wherein said rotating shaft drives a centrifuge.

20. The device of claim 13 wherein the rotating shaft is driven by an AC electric motor.

21. The device of claim 13 wherein the rotating shaft is driven by a DC electric motor.

22. The method of claim 11, wherein $$\phi(t)=\phi_I+\delta(t)$$

where $\phi_I$ is a nominal phase, and $\delta(t)$ is a random variable.

23. The method of claim 11, wherein $$b(t)=B+\gamma(t)$$

where B is a nominal input voltage, and $\gamma(t)$ is a random variable.

* * * * *